(12) United States Patent
Takaiwa

(10) Patent No.: US 7,336,307 B2
(45) Date of Patent: Feb. 26, 2008

(54) CAMERA HAVING ACCUMULATION OPERATION IN THE PERIOD BETWEEN THE TIME OF FULLY OPENING A LEADING SHUTTER AND THE TIME OF STARTING OF A TRAILING SHUTTER

(75) Inventor: Kan Takaiwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 655 days.

(21) Appl. No.: 10/372,702

(22) Filed: Feb. 24, 2003

(65) Prior Publication Data

US 2003/0161621 A1  Aug. 28, 2003

(30) Foreign Application Priority Data

Feb. 27, 2002  (JP) ............................. 2002-050653

(51) Int. Cl.
*H04N 3/14* (2006.01)
*H04N 5/335* (2006.01)

(52) U.S. Cl. ...................... 348/296; 348/297; 396/472; 396/495

(58) Field of Classification Search ................. 348/296
See application file for complete search history.

(56) References Cited

U.S. PATENT DOCUMENTS

| | | | | |
|---|---|---|---|---|
| 4,589,023 A | * | 5/1986 | Suzuki et al. | 348/341 |
| 5,012,271 A | * | 4/1991 | Nishimura et al. | 396/234 |
| 5,023,723 A | * | 6/1991 | Date et al. | 348/337 |
| 5,355,166 A | * | 10/1994 | Date et al. | 386/38 |
| 5,539,456 A | * | 7/1996 | Ishii | 348/224.1 |
| 5,752,089 A | * | 5/1998 | Miyazawa et al. | 396/48 |
| 5,940,640 A | * | 8/1999 | Karasawa | 396/301 |
| 5,987,261 A | * | 11/1999 | Sugahara et al. | 396/61 |
| 6,295,413 B1 | * | 9/2001 | Ogasawara | 396/155 |
| 6,404,987 B1 | * | 6/2002 | Fukui | 396/56 |
| 6,801,257 B2 | * | 10/2004 | Segev et al. | 348/296 |
| 6,999,125 B2 | * | 2/2006 | Fujiwara et al. | 348/362 |
| 2002/0034382 A1 | * | 3/2002 | Tokunaga et al. | 396/157 |

* cited by examiner

*Primary Examiner*—Lin Ye
*Assistant Examiner*—Hung Lam
(74) *Attorney, Agent, or Firm*—Cowan, Liebowitz & Latman, P.C.

(57) ABSTRACT

Disclosed is a camera including: an image-taking device; a shutter unit having a first shutter member that travels from a position where a shutter opening is closed to a position which is retreated from the opening, and a second shutter member that travels from the position which is retreated from the shutter opening to the position where the opening is closed; a lighting unit that lights a subject; and a control circuit that controls the shutter unit, the lighting unit and the image-taking device, in which the control circuit makes the first shutter member travel, and executes an accumulation operation of the image-taking device after the shutter opening is fully opened in an image taking mode in which the subject is lighted by the lighting unit, and makes the second shutter member travel in association with stop of the accumulation operation.

6 Claims, 10 Drawing Sheets

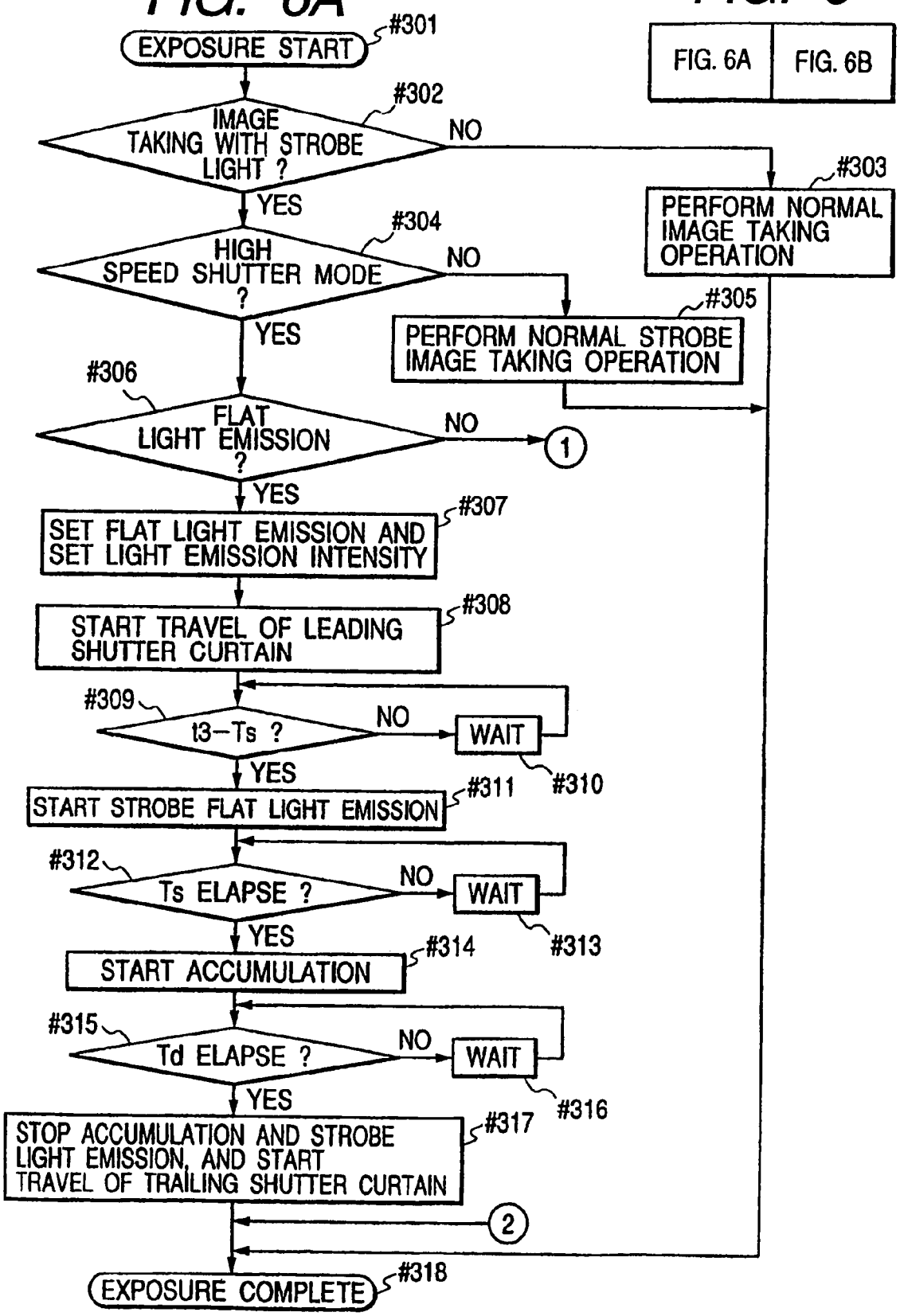

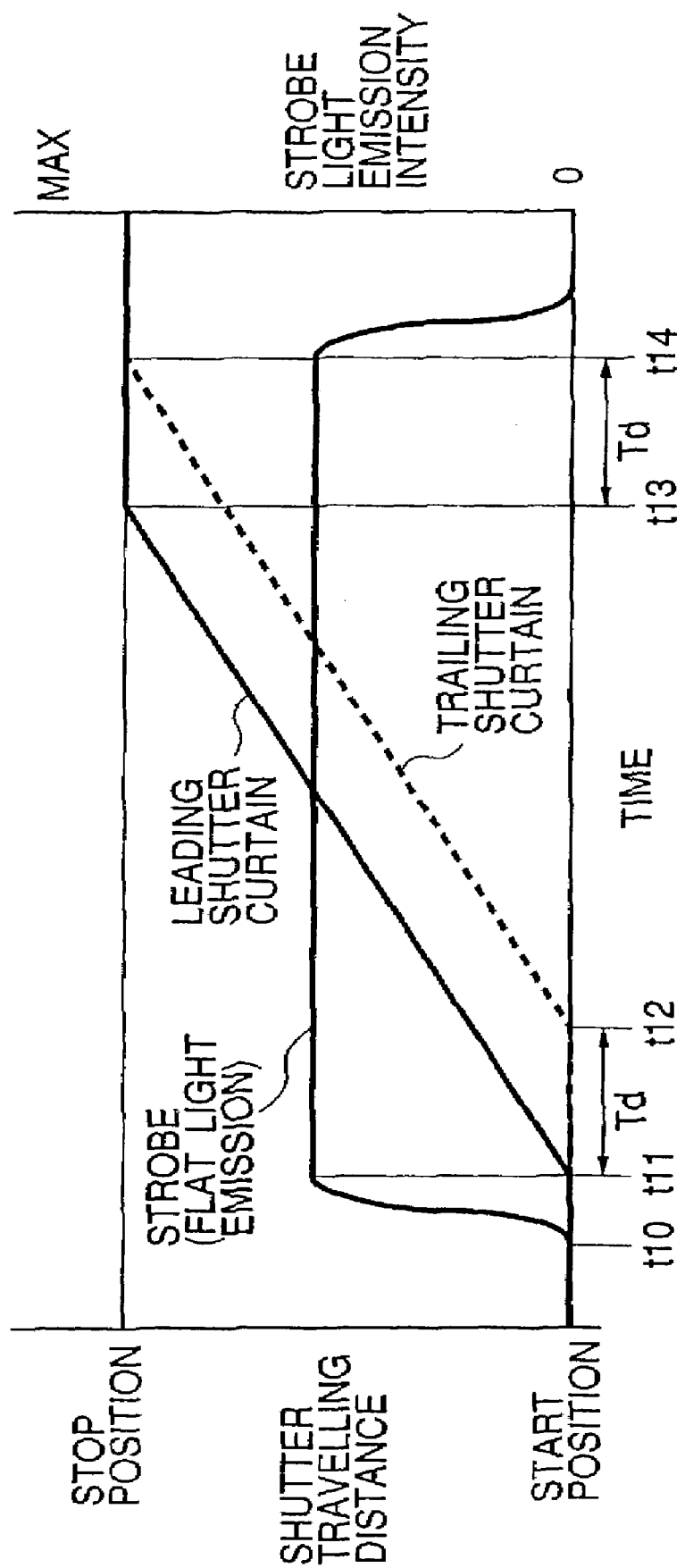

CAMERA HAVING ACCUMULATION OPERATION IN THE PERIOD BETWEEN THE TIME OF FULLY OPENING A LEADING SHUTTER AND THE TIME OF STARTING OF A TRAILING SHUTTER

BACKGROUND OF THE INVENTION

1. Field of the Invention

The present invention relates to an improvement in a still image-taking device (camera) having a focal plane shutter and a strobe light emission device.

2. Related Background Art

In a still image-taking device having the focal plane shutter, a slit exposure is conducted in a fast shutter speed having no time where the focal plane shutter is fully opened, i.e., in a so-called high-speed shutter mode.

FIG. 7 is a diagram showing a relationship between travel states of a leading shutter curtain and a trailing shutter curtain and an exposure time at a slit exposure time, in which the leading shutter curtain starts to travel at a time t11, and an exposure starts from an upper end of the image-taking element. Then, the trailing shutter curtain starts to travel at a time t12 delayed from t11 by a given period of time, in which light-shielding is made from the upper end of the image taking element to stop the exposure. The travel speeds of the leading shutter curtain and the trailing shutter curtain are so adjusted as to be identical with each other, and the exposure is sequentially conducted over an overall region of the upper end to the lower end of the image taking element for a given time period Td (t12 to t11). Times t13 and t14 are travel completion times of the leading shutter curtain and the trailing shutter curtain, and a time period (t14 to t13) is also a given time period Td.

When strobe image taking operation is going to be conducted during the above slit exposure, since the strobe light emission can be conducted only during the exposure of a part of a screen as shown in FIG. 8, resulting in an exposure unevenness, the strobe image taking operation is conducted only in a slow shutter speed having a time where the focal plane shutter is fully opened up to now. However, in recent years, a strobe light emission device having a so-called flat light emission mode that emits a light having a constant light emission intensity for a long period of time as compared with the conventional device is produced, and strobe image taking operation can be conducted even at the time of a high speed shutter operation which involves the slit exposure by using this mode.

FIG. 9 shows the operation of the leading shutter curtain and the trailing shutter curtain and the light emission state of the strobe light emission device when the image taking operation with the strobe is conducted during the slit exposure by using the strobe light emission device having the flat light emission mode.

The operation will be described with reference to FIG. 9. The strobe light emission device starts to emit a light at a time t10 prior to a time t11 at which the leading shutter curtain starts to travel. In this situation, an interval between the time t10 and the time t11 is set to a given period of time which is necessary to stabilize the light emission intensity of the strobe light emission device. That is, after the light emission intensity of the strobe light emission device has been stabilized, the leading shutter curtain starts to travel, and then the trailing shutter curtain starts to travel at a time t12 after a given time period Td has elapsed. In addition, when the travel of the trailing shutter curtain is completed at a time t14, the light emission of the strobe light emission device is stopped. The image taking operation with the strobe can be thus conducted even at the high-speed shutter mode having no shutter full open time.

However, in the above-mentioned still image-taking device having the focal plane shutter, although the strobe light emission device emits a light with a constant intensity from the travel start of the leading shutter curtain till the travel completion of the trailing shutter curtain in the strobe image taking operation at the high speed shutter mode, the strobe light reaches only a slight part of the image taking element if attention is paid to a time point during the exposure, and the remaining strobe light is absorbed by the shutter curtain. For example, in FIG. 9, assuming that a given time period Td which corresponds to an exposure period of time (shutter speed) is 1 msec, and the travel period of time of the leading shutter curtain and the trailing shutter curtain (t13-t11)=(t14-t12) is 4 msec, the flat light emission period of time during which a stabilized strobe light is emitted as required is at least 5 msec, and an energy of 80% or more is in vain. Also, because a light emission intensity must be restricted in order to conduct the flat light emission for a long period of time such as 5 msec, there are such disadvantages that an energy loss is large and a guide number indicative of the effective distance of the strobe image taking operation is also small.

SUMMARY OF THE INVENTION

The present invention has been made in view of the above-mentioned circumstances, and therefore a first object of the present invention is to provide a still image-taking device which lessens an energy loss of a light emission of a strobe light emission device and can conduct a strobe image taking operation with an appropriate amount of light without miscalculating an image taking operation effective distance even in a high speed shutter mode.

A second object of the present invention is to provide a still image-taking device which has no flat light emission mode, and is capable of appropriately conducting the strobe image taking operation in the high speed shutter mode even if the strobe light emission device that emits a light at a flash light emission mode is used.

A third object of the present invention is to provide a still image-taking device which controls the amount of light emission with high precision by using the flat light emission mode when a required light emission intensity is low, and makes the amount of light emission large by using the flash light emission mode when the required light emission intensity is high, thus being capable of appropriately conducting the strobe image taking operation.

Therefore, according to one aspect of the present invention, a camera includes:

an image-taking device;

a shutter unit having a first shutter member that travels from a position where a shutter opening is closed to a position which is retreated from the opening, and a second shutter member that travels from the position which is retreated from the shutter opening to the position where the opening is closed, the image-taking device being exposed by light by the second shutter member traveling after the first shutter member travels;

a lighting unit that lights a subject; and a control circuit that controls the shutter unit, the lighting unit and the image-taking device, in which the control circuit makes the first shutter member travel, and executes an accumulation operation of the image-taking device after the shutter opening is fully opened in an image taking mode in which the subject is lighted by the lighting unit, and makes the second shutter member travel in association with stop of the accumulation operation.

In further another aspect of the camera, when the control circuit judges that a shutter speed arithmetically calculated based on photometry information of the subject is faster than a shutter speed where the shutter opening is fully opened by the first and second shutter members, a series of operations made by the control circuit is executed.

In further another aspect of the camera, the control circuit conducts lighting operation by the lighting unit while the image-taking device conducts the accumulation operation.

In further another aspect of the camera, the control circuit conducts lighting operation by the lighting unit in association with start of the accumulation operation of the image-taking device, and completes the accumulation operation of the image-taking device after the lighting operation has been completed.

In further another aspect of the camera, the control circuit has a first mode in which the lighting operation is conducted by the lighting unit while the image-taking device conducts the accumulation operation, and a second mode in which the lighting operation is conducted by the lighting unit in association with the start of the accumulation operation of the image-taking device, and the accumulation operation of the image-taking device is completed after the lighting operation has been completed.

In further another aspect of the camera, the control circuit selects the first mode when a distance to the subject is shorter, and selects the second mode when the distance to the subject is longer.

These and other objects and characteristics of this invention will become more fully apparent from the following detailed description taken with the accompanying drawings.

BRIEF DESCRIPTION OF THE DRAWINGS

FIG. 9 is a timing chart showing the shutter curtain, the accumulation of the image taking element and the light emission state of the strobe light emission device in the conventional case where strobe image taking operation is conducted at the time of slit exposure.

DESCRIPTION OF THE PREFERRED EMBODIMENTS

Hereinafter, a description will be given in more detail of preferred embodiments of the present invention with reference to the accompanying drawings.

First Embodiment

Figure 1:
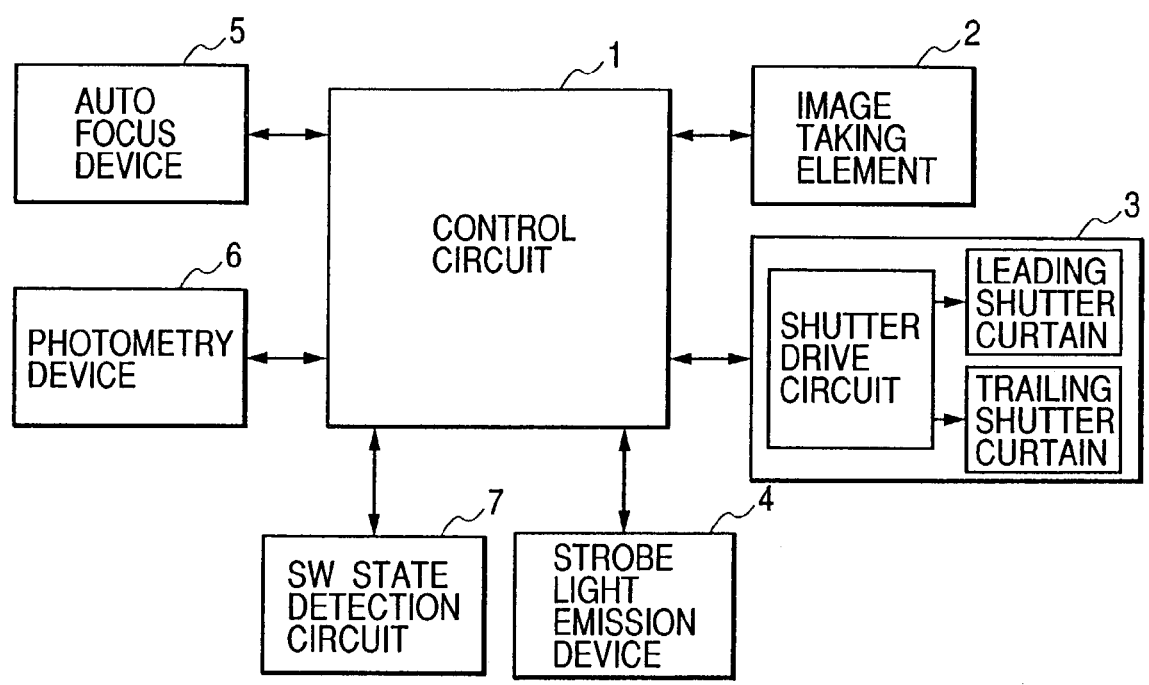
FIG. 1 is a block diagram showing a schematic structure of a still image-taking device in accordance with each of embodiments of the present invention.

FIG. 1 is a block diagram showing the outline of an electric structure of a still image-taking device having a focal plane shutter in accordance with a first embodiment of the present invention.

Referring to FIG. 1, reference numeral 1 denotes a control circuit (central processing unit (CPU)) for controlling the various operations of the still image-taking device, and reference numeral 2 denotes an image taking element (CCD) which is an image recording medium. Reference numeral 3 denotes a shutter drive device that drives a focal plane shutter which is made up of a shutter drive circuit, a leading shutter curtain, a trailing shutter curtain and so on. Reference numeral 4 denotes an internal or external strobe light emission device that has a normal flash light emission mode and a flat light emission mode as the light emission mode. Reference numeral 5 denotes an auto focus device that detects a focal state of a lens and adjusts the focal point of the lens, reference numeral 6 denotes a photometry device that obtains photometry information of a subject in order to obtain a given time period Td corresponding to an exposure period of time (shutter speed) which will be described later, by the control circuit 1, and reference numeral 7 denotes a switch (SW) state detection circuit that detects the states of various switches such as switches for starting the auto focus device 5 or the photometry device 6, or starting the exposure operation. In particular, the control circuit arithmetically calculates a diaphragm, a shutter speed, and an accumulation time period of the image taking element through given program on the basis of the photometry result.

Figure 2:
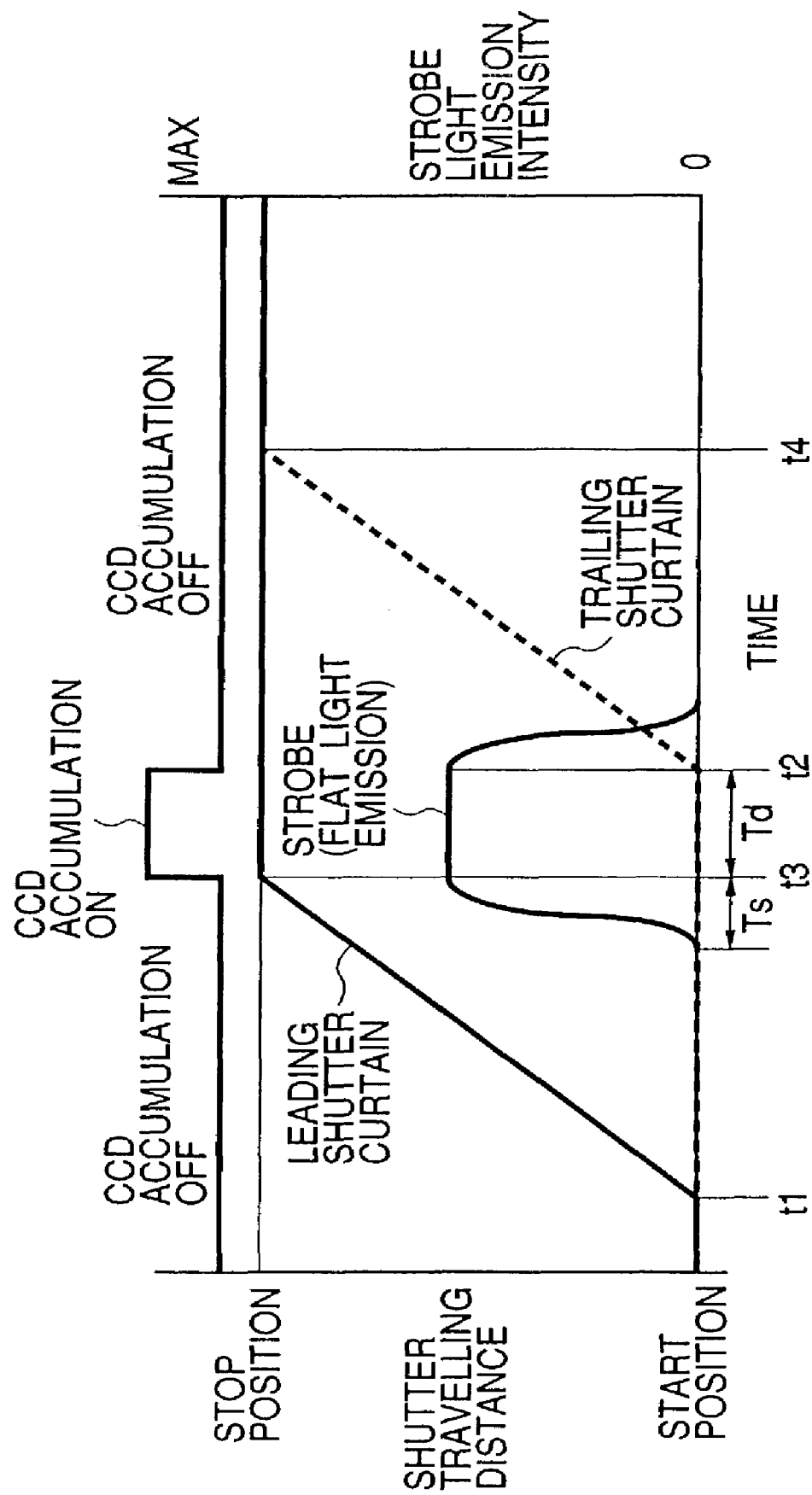
FIG. 2 is a timing chart showing a shutter curtain of a still image-taking device, an accumulation of an image taking element and a light emission state of a strobe light emission device in accordance with a first embodiment of the present invention.
Figure 3:
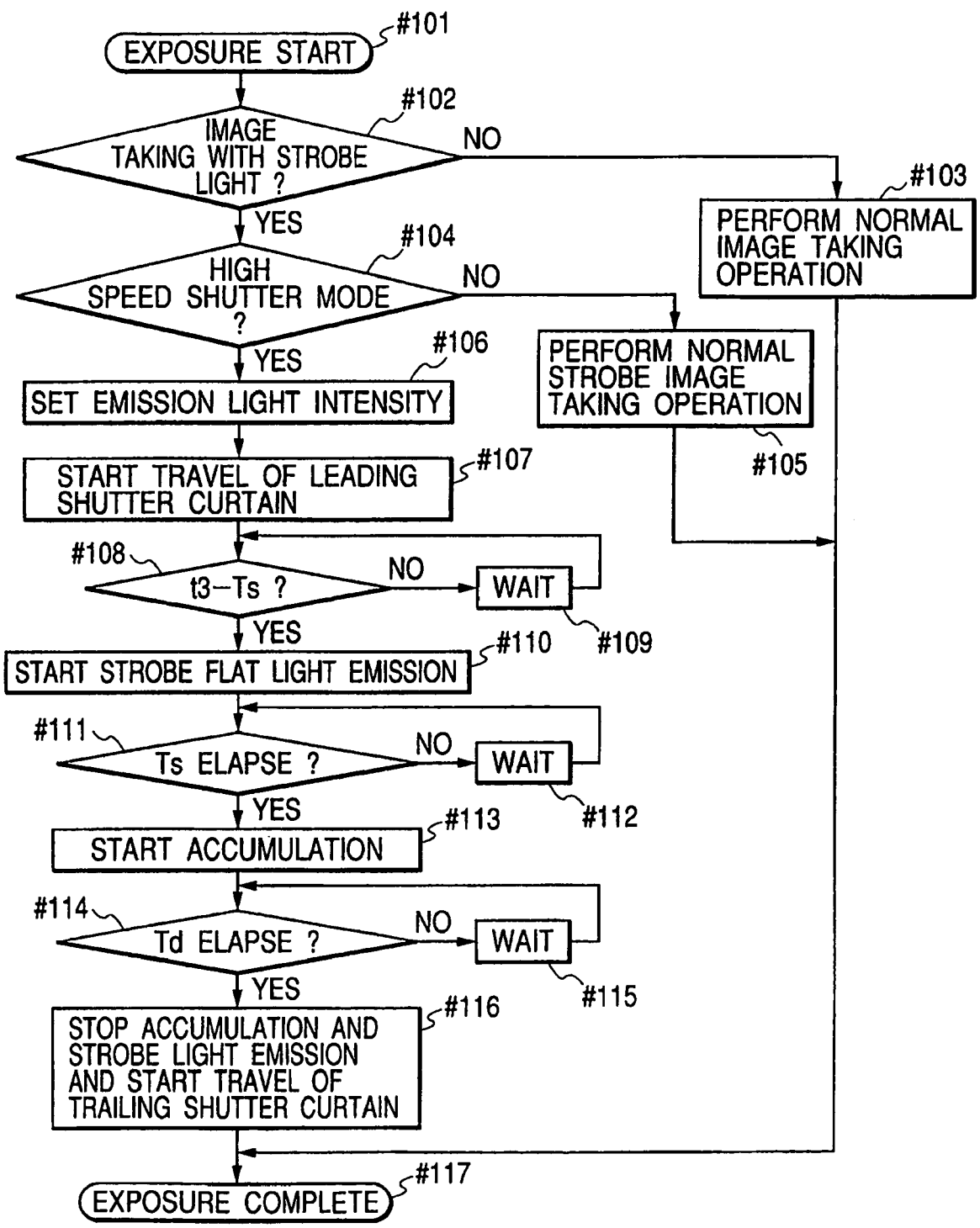
FIG. 3 is a flowchart showing a control sequence in accordance with the first embodiment of the present invention.

FIG. 2 is a timing chart showing the states of the shutter curtain, the accumulation of the image taking element, and the light emission of the strobe light emission device in the still image-taking device having the focal plane shutter shown in FIG. 1, and FIG. 3 is a flowchart showing the control sequence in the first embodiment. In this example, it is assumed that required exposure period of time and the strobe light emission intensity are given before the sequence shown in FIG. 3 starts.

Hereinafter, the operation of the main part will be described in accordance with the flowchart shown in FIG. 3 with reference to the timing chart shown in FIG. 2.

In FIG. 3, when an exposure sequence starts at a step #101, it is first judged in the control circuit 1 whether the strobe image taking mode is applied, or not at a step #102. As a result, if the strobe image-taking mode is not applied, the processing advances to a step #103, in which the image taking operation is conducted under a normal shutter control, and the exposure operation is completed at a step #117.

The image taking operation under a normal shutter control that does not use the strobe light emission device 4 will be described in brief. When the shutter speed in the image taking operation is a fast shutter speed having no time where the focal plane shutter is fully opened, that is, when the image taking operation is conducted at the high speed shutter mode, the slit exposure is performed using the focal plane shutter as well as control is made in such a manner that the accumulation start of the image taking element 2 is conducted before the travel start of the leading shutter curtain of the focal plane shutter, and the accumulation completion of the image taking element 2 is conducted after the travel completion of the trailing shutter curtain of the focal plane shutter as shown in FIG. 9.

On the other hand, when it is judged at the step #102 that the strobe image taking mode is applied, the processing advances to a step #104, in which it is judged whether the shutter speed is the high speed shutter mode (the shutter speed calculated through arithmetic operation is a fast shutter speed having no time where the focal plane shutter is fully opened), or not. If it is not the high speed shutter, the processing advances to a step #105, in which the image taking operation is conducted under the normal shutter control and strobe control, and the exposure operation is completed at a step #117.

Also, when it is judged at the step #104 that the shutter speed is the high speed shutter mode, the control circuit 1 advances the operation to a step #106, in which the strobe light emission mode is set to the flat light emission mode, and a given flat light emission intensity is set to the strobe light emission device 4. Then, at a succeeding step #107, the shutter drive device 3 is driven to allow the leading shutter curtain to travel at a time t1 shown in FIG. 2. At a succeeding step #108, it is judged whether the time reaches a time t3-TS shown in FIG. 2, or not, and if not, the processing is put in a standby state until it reaches a time t3-Ts at a step #109, and thereafter, the processing returns to the step #108, in which the processing immediately advances to a step #110 since the time t3-Ts has been already reached at this stage, and the strobe light emission starts by the strobe light emission device 4 at a timing earlier than the leading shutter curtain travel completion time t3 by a given period of time (a timing of t3-Ts). In this example, the Ts is a period of time required to stabilize the light emission intensity of the strobe light emission device 4.

In a succeeding step #111, since the light emission intensity of the strobe light emission device 4 has been already stabilized at the leading shutter curtain travel completion time t3 as shown in FIG. 2, the control circuit 1 starts the accumulation of the image taking element (CCD) 2. Then, in succeeding steps #114 and #115, the processing is put in a standby state until the given time period Td elapses which corresponds to the shutter speed given on the basis of the photometry result by the photometry device 6 in advance, and when the given time period Td elapses, the processing advances from the step #114 to the step #116, in which the accumulation of the image taking element 2 and the light emission of the strobe light emission device 4 stop, and the travel of the trailing shutter curtain starts (the time t2 in FIG. 2). Thereafter, when the travel of the trailing shutter curtain is completed, the processing advances to a step #117 where the exposure operation is completed.

According to the above-mentioned first embodiment, in the strobe image taking operation at the high speed shutter mode (the shutter speed calculated through arithmetic operation on the basis of the photometry information or the like) having no full open time of the focal plane shutter, the following are adopted. That is, the strobe light emission device 4 conducts the flat light emission and the accumulation of the image taking element 2 starts after the travel of the leading shutter curtain has been completed (a timing of the time t3 in FIG. 2, from the step #108 to step #110 in FIG. 3). Then, the trailing shutter curtain travels after the light emission of the strobe light emission device 4 and the accumulation of the image taking element 2 stop after the high speed shutter mode (a timing of the time t2 after the exposure (accumulation) period Td has elapsed from the time t3 in FIG. 2, from the step #114 to step #116 in FIG. 3).

Therefore, there can be provided a still image-taking device that conducts strobe image taking operation with an appropriate amount of light, and lessens the energy loss of the light emission of the strobe light emission device 4 and does not miscalculate the image taking operation effective distance even at the high speed shutter mode.

Second Embodiment

Figure 4:
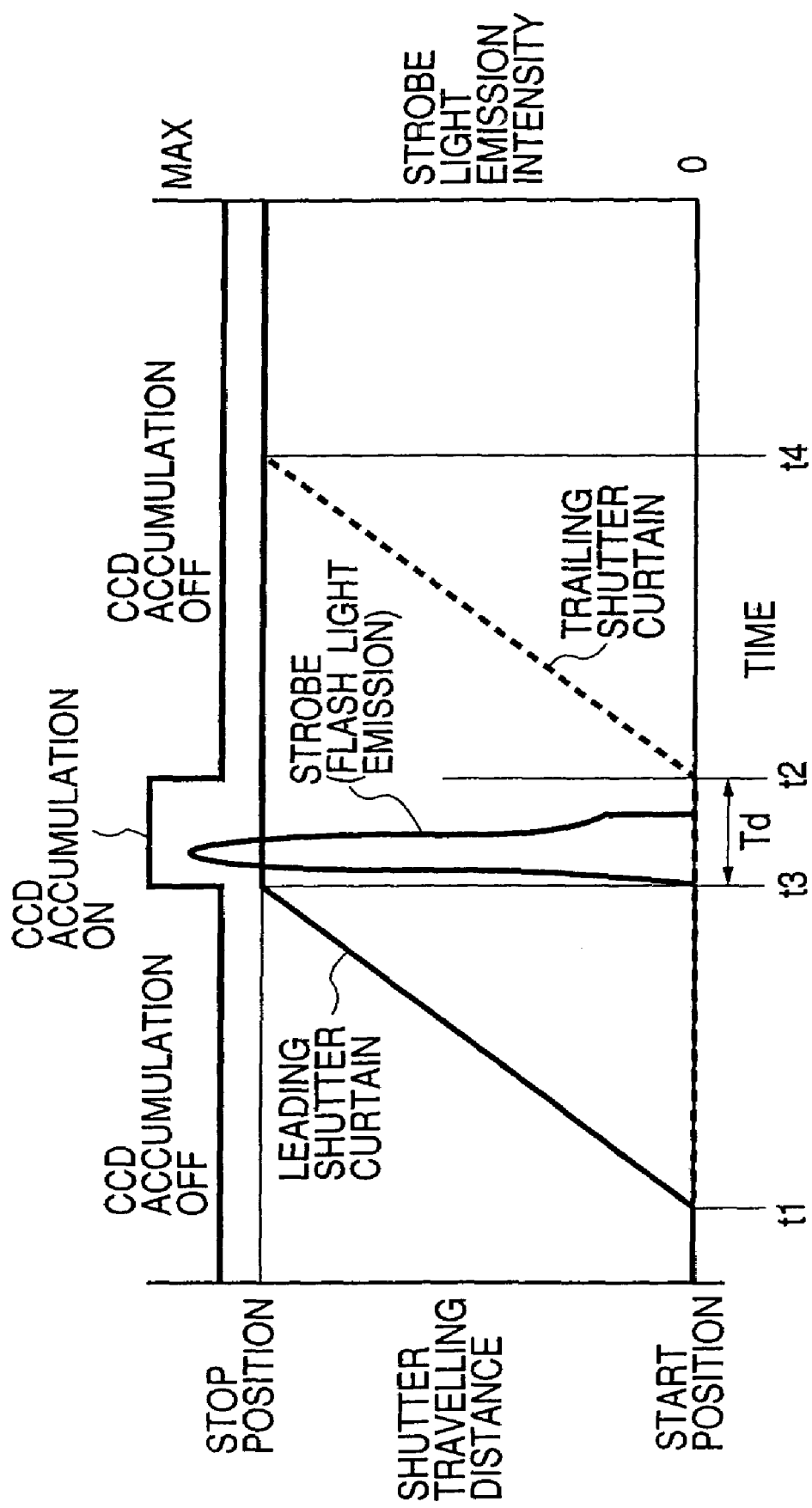
FIG. 4 is a timing chart showing the shutter curtain of a still image-taking device, the accumulation of an image taking element and the light emission state of a strobe light emission device in accordance with the first embodiment of the present invention.
Figure 5:
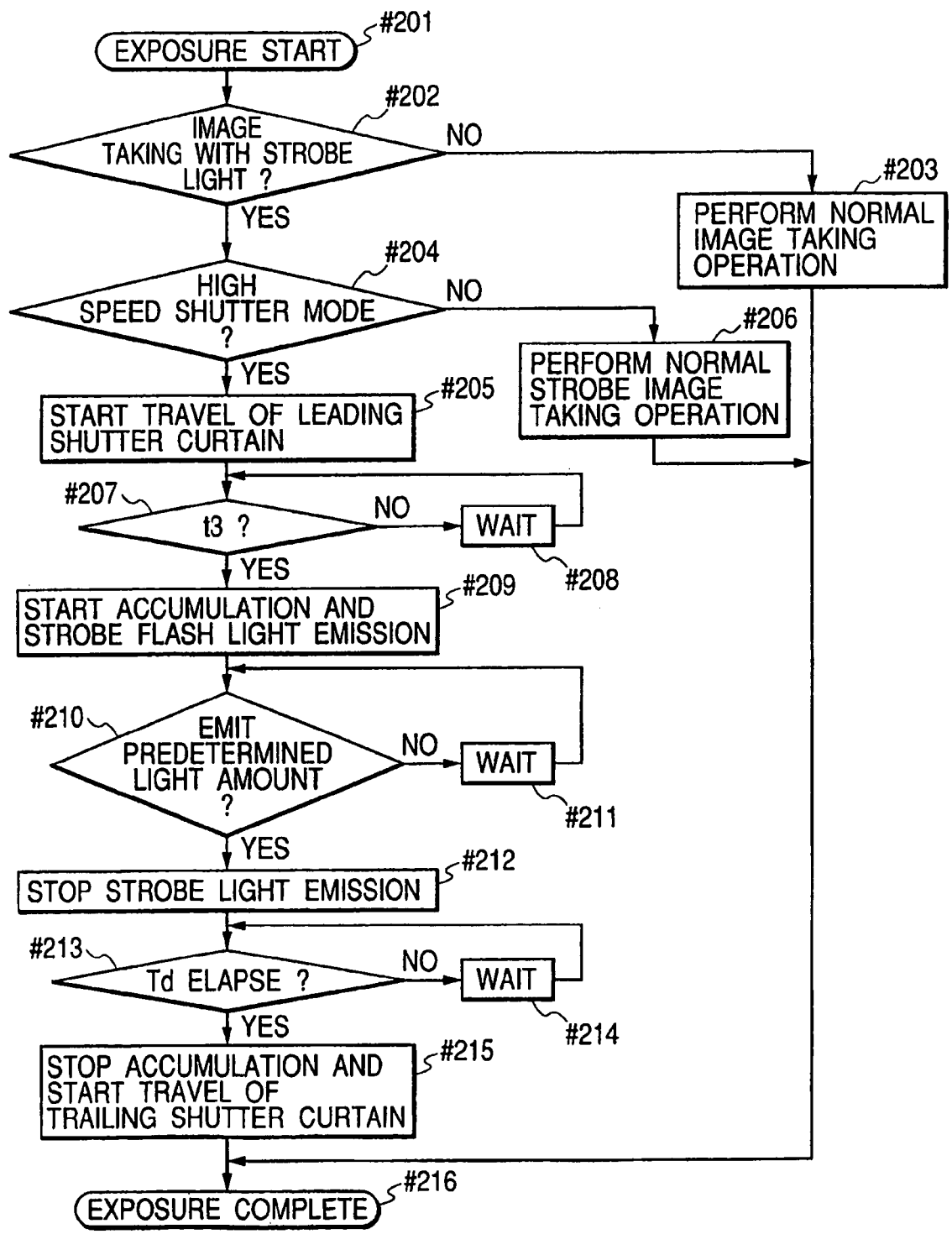
FIG. 5 is a flowchart showing a control sequence in accordance with a second embodiment of the present invention.

FIG. 4 is a timing chart showing the states of the shutter curtain, the accumulation of the image taking element, and the light emission of the strobe light emission device in the still image-taking device in accordance with a second embodiment of the present invention. FIG. 5 is a flowchart showing the control sequence in the second embodiment. In this example, it is assumed that required exposure period of time and the strobe light emission intensity are given before the sequence shown in FIG. 5 starts. Also, the circuit configuration of the still image taking device is the same as that shown in FIG. 1. The strobe light emission device is assumed to adopt only the setting of the flash light emission mode.

Hereinafter, the operation of the main part will be described in accordance with the flowchart shown in FIG. 5 with reference to the timing chart shown in FIG. 4.

When an exposure sequence starts at a step #201, it is first judged in the control circuit 1 whether the strobe image-taking mode is applied, or not at a step #202. As a result, if the strobe image-taking mode is not applied, the processing advances to a step #203, in which the image taking operation is conducted under a normal shutter control, and the exposure operation is completed at a step #216. On the other hand, when it is judged at the step #202 that the strobe image-taking mode is applied, the processing advances to a step #204, in which it is judged whether the shutter mode is the high speed shutter mode, or not, and if it is not the high speed shutter mode, the processing advances to a step #206, in which the image taking operation is conducted under the normal shutter control and strobe control, and the exposure operation is completed at a step #216.

Also, when it is judged at the step #204 that the shutter speed is the high speed shutter mode, the control circuit 1 advances the operation to a step #205, in which the shutter drive device 3 is driven to allow the leading shutter curtain to travel at a time t1 shown in FIG. 4. At a succeeding step #207, it is judged whether the time reaches a time t3 shown in FIG. 4, or not, and if not, the processing is put in a standby state until it reaches a time t3 at a step #208, and thereafter, the processing returns to the step #207, in which the processing immediately advances to a step #209 since the time t3 has been already reached at this stage.

The processing advances to a step #209, in which the control circuit 1 starts the accumulation of the image taking element 2 and also makes the strobe light emission device 4 conduct the flash light emission (different from the flat light emission shown in FIG. 2), and waits until the light emission of the strobe light emission device 4 reaches a given amount (the integrated value of the amount of light emission reaches a given amount) in succeeding steps #210 and #211. The processing advances from the step #210 to the step #212 when the light emission of the strobe light emission device 4 reaches the given amount, to stop the flash light emission. Then, in succeeding steps #213 and #214, the control circuit 1 waits for the same time period Td as the shutter speed given on the basis of the photometry result by the photometry device 6 in advance to elapse, and when the time period Td elapses, the processing advances from the step #213 to a step #215 in which the accumulation of the image taking element 2 stops and the trailing shutter curtain starts to travel (the time t2 in FIG. 4). Thereafter, when the travel of the trailing shutter curtain is completed, the processing advances to a step #216 where the exposure operation is completed.

According to the above-mentioned second embodiment, in the strobe image taking operation at the high speed shutter mode having no time where the focal plane shutter is fully opened, the accumulation of the image taking element 2 starts after the travel of the leading shutter curtain has been completed, the strobe light emission device 4 emits a flash light (a timing at a time t3 in FIG. 4, from the step #207 to a step #209 in FIG. 5), and the light emission of the strobe light emission device 4 is stopped after the light emission reaches the given amount (a step #212 in FIG. 5). Also, the accumulation of the image taking element 2 stops immediately after the exposure period of time has elapsed, and the trailing shutter curtain travels immediately after that time (a timing of the time t2 after the exposure (accumulation) time period Td has elapsed from the time t3 in FIG. 4, from the step #213 to step #215 in FIG. 5).

Therefore, there can be provided the still image-taking device that conducts the image taking operation with the strobe at the high speed shutter time, even if the strobe light emission device 4 that performs light emission at the flash light emission mode is used.

Third Embodiment

Figure 6B:
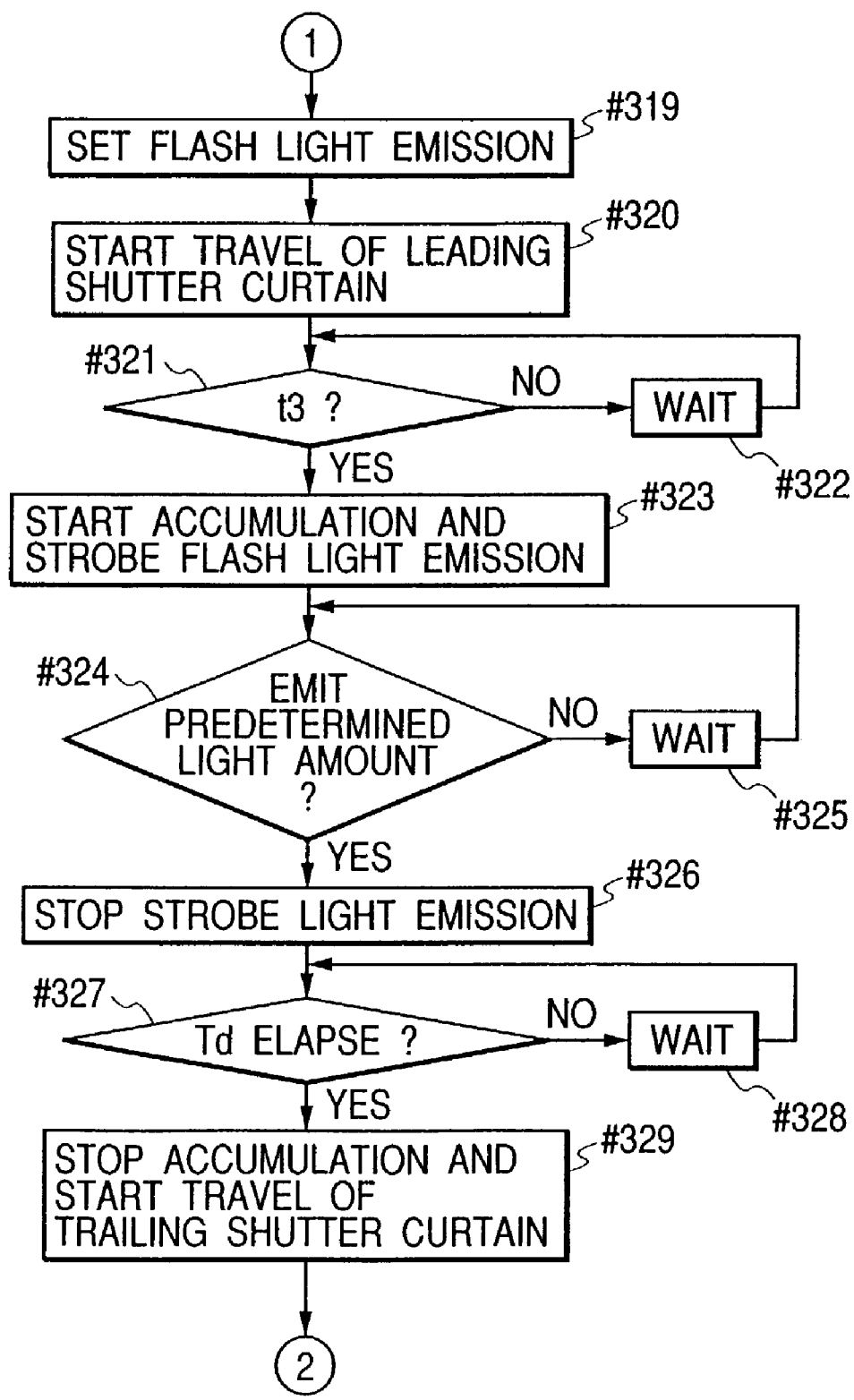
FIG. 6, composed of FIGS. 6A and 6B, is a flowchart showing a control sequence in accordance with a third embodiment of the present invention.
Figure 7:
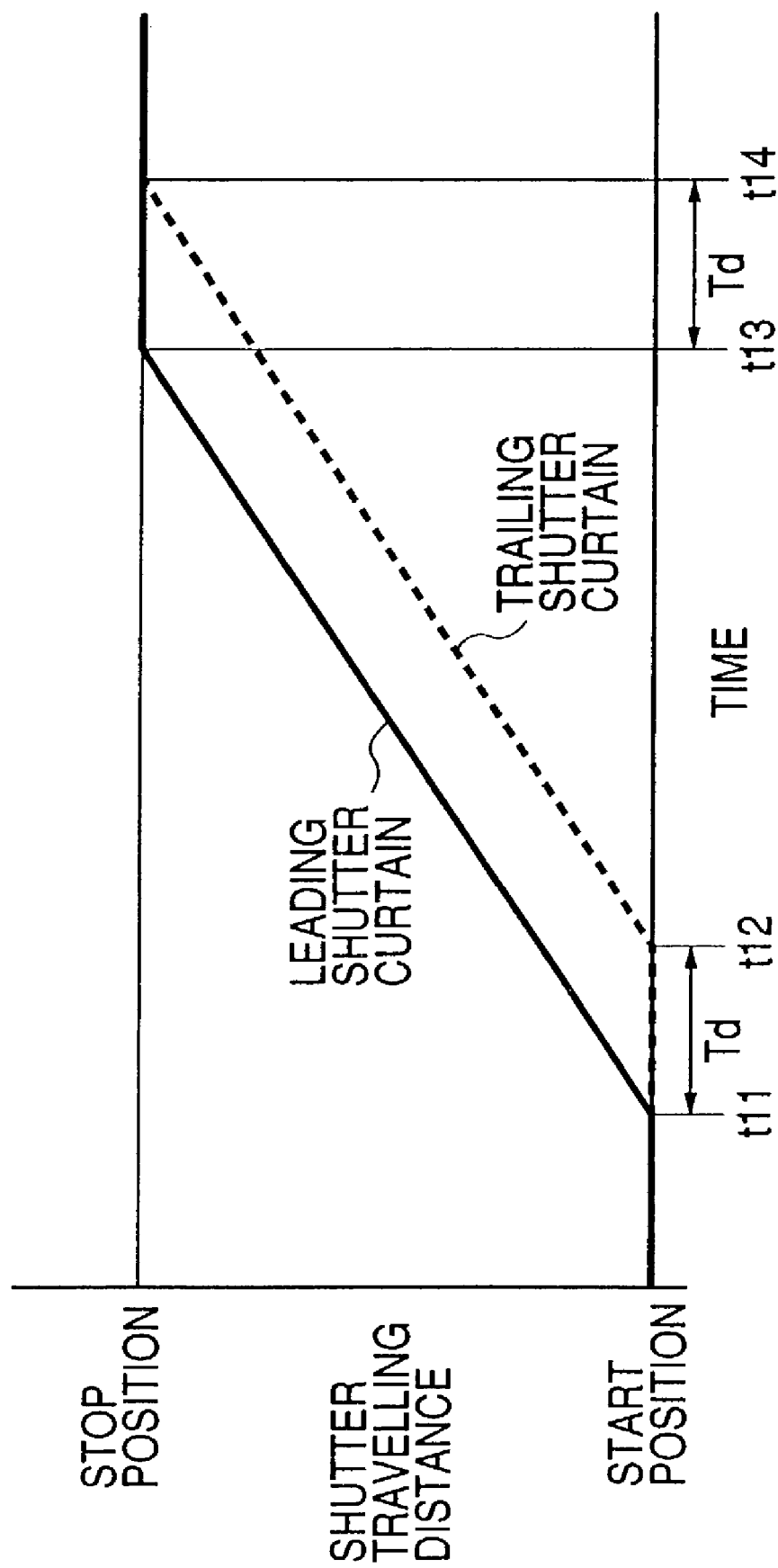
FIG. 7 is a diagram showing a state of a conventional shutter curtain at the slit exposure time.
Figure 8:
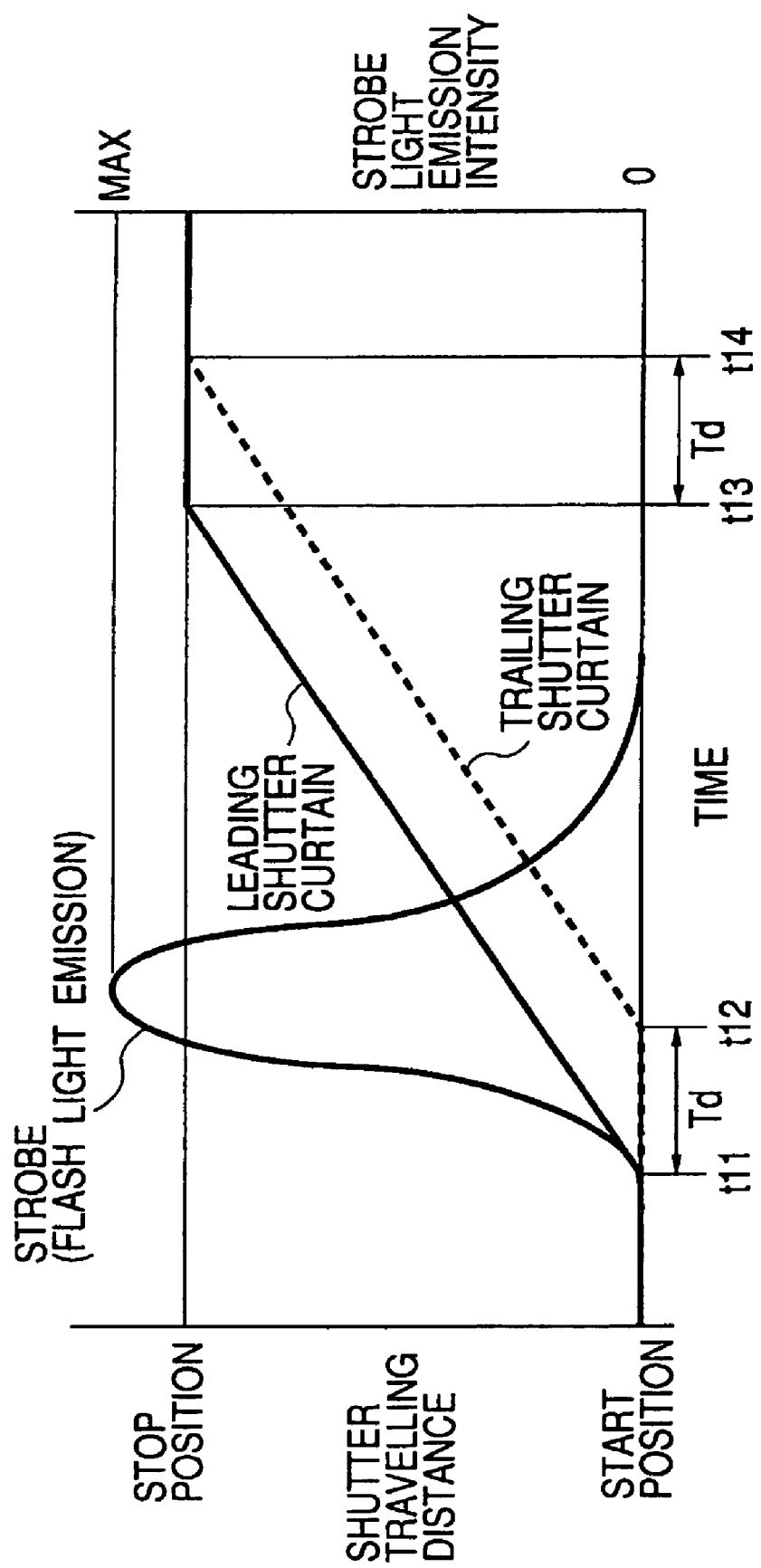
FIG. 8 is a timing chart showing the shutter curtain, the accumulation of the image taking element and the light emission state of the strobe light emission device in the case where the conventional strobe light emission device emits a flash light during the slit exposure.

FIGS. 6A and 6B are flowcharts showing the control sequence of the main part of a still image-taking device in accordance with a third embodiment of the present invention. In this example, it is assumed that the required exposure time and strobe light emission intensity are given before the sequence shown in FIGS. 6A and 6B start. Also, the circuit configuration of the still image-taking device is identical with that shown in FIG. 1.

Hereinafter, the operation of the main part will be described in accordance with the flowchart shown in FIGS. 6A and 6B with reference to the timing charts shown in FIGS. 2 and 4.

When an exposure sequence starts at a step #301, it is first judged in the control circuit 1 whether the strobe image taking mode is applied, or not at a step #302. As a result, if the strobe image-taking mode is not applied, the processing advances to a step #303, in which the image taking operation is conducted under a normal shutter control, and the exposure operation is completed at a step #318. On the other hand, when it is judged at the step #302 that the strobe image-taking mode is applied, the processing advances to a step #304, in which it is judged whether the shutter speed is the high speed shutter mode, or not, and if it is not the high speed shutter mode, the processing advances to a step #306, in which the image taking operation is conducted under the normal shutter control and strobe control, and the exposure operation is completed at a step #318.

Also, if it is judged in the step #304 that the high speed shutter mode is applied, the control circuit 1 advances the operation to a step #306 where it is judged whether the required light emission intensity is obtained by the flat light emission, or not, on the basis of the distance to the subject or the like. If the required light emission intensity is obtained in the flat light emission mode, the processing advances to a step #307 where the strobe light emission device 4 is set to the flat light emission mode, and a given flat light emission intensity is set, and in a succeeding step #308, the leading shutter curtain travels at the time t1 shown in FIG. 2. Subsequently, in a step #309, it is judged whether or not the time reaches a time t3-Ts shown in FIG. 2, and if not, the processing is put in a standby state until the time reaches the time t3-Ts in a step #310. Thereafter, the processing returns to the step #309 and at this stage, the time t3-Ts has been already reached, so that the processing immediately advances to the step #311 where the strobe light emission device 4 is made to start the strobe light emission at a timing (a timing of t3-Ts) earlier than the leading shutter curtain travel completion time t3 by a given period of time. In this example, Ts is a period of time required to stabilize the light emission intensity of the strobe light emission device 4.

In a succeeding step #312, the control circuit 1 starts the accumulation of the image taking element 2 (CCD) since the light emission intensity of the strobe light emission device 4 has been already stabilized at the leading shutter curtain travel completion time t3 as shown in FIG. 2. Then, in succeeding steps #315 and #316, it waits for the same time period Td as that of the shutter speed given on the basis of the photometry result by the photometry device 6 in advance to elapse, and when the time period Td elapses, the processing advances from the step #315 to a step #317 where the accumulation of the image taking element 2 and the light emission of the strobe light emission device 4 stop, and the travel of the trailing shutter curtain starts (a time t2 in FIG. 2). Thereafter, when the travel of the trailing shutter curtain is completed, the processing advances to a step #318 in which the exposure operation is completed.

Also, in the above step #306, if the necessary light emission intensity is not obtained in the flat light emission mode, the control circuit 1 advances the operation to the step S319 in which the strobe light emission device 4 is set to the flash light emission mode. Then, in a succeeding step #320, the leading shutter curtain travels at the time t1 shown in FIG. 4, and in a succeeding step #321, it is judged whether the time reaches the time t3 shown in FIG. 4, or not, and if not, the processing is put in a standby state until the time reaches the time t3 in a step #322. Thereafter, the processing returns to the step #321 in which the processing immediately advances to a step #323 since the time has already reached the time t3 at this stage.

When the processing advances to a step #323, the control circuit 1 starts the accumulation of the image taking element 2 and also makes the strobe light emission device 4 conduct the flash light emission, and waits until the light emission of the strobe light emission device 4 reaches a given amount (the integrated value of the amount of light emission reaches a given amount) in succeeding steps #324 and #325. Then, the processing advances from the step #324 to the step #326 when the light emission of the strobe light emission device 4 reaches the given amount, to stop the flash light emission. Then, in succeeding steps #327 and #328, the control circuit 1 waits for the same time period Td as the shutter speed given on the basis of the photometry result by the photometry device 6 in advance to elapse, and when the time period Td elapses, the processing advances from the step #327 to a step #329 in which the accumulation of the image taking element 2 stops and the trailing shutter curtain starts to travel (the time t2 in FIG. 4). Thereafter, when the travel of the trailing shutter curtain is completed, the processing advances to a step #318 where the exposure operation is completed.

According to the above-mentioned third embodiment, in the strobe image taking operation at the high speed shutter mode having no time where the focal plane shutter is fully opened, in the case where the required light emission intensity is obtained in the flat light emission (for example, the distance to the subject is shorter than a given distance), control is made in such a manner that the strobe light emission device 4 conducts flat light emission and the accumulation of the image taking element 2 starts after the leading shutter curtain travel completion, and the light emission of the strobe light emission device 4 and the accumulation of the image taking element 2 stop to allow the trailing shutter curtain to travel after a given period of time (steps #306 to #317 in FIG. 5). On the other hand, in the case where the required light emission intensity is not obtained in the flat light emission (for example, the distance to the subject is longer than the given distance), control is made in such a manner that the accumulation of the image taking element 2 starts and the strobe light emission device 4 conducts flash light emission after the leading shutter curtain travel completion, and the light emission of the strobe light emission device 4 stops after a given amount of light emission is obtained in the light emission, and the accumulation of the image taking element 2 stops after a given accumulation time period elapses, and thereafter the trailing shutter curtain travels (from the step #306 to steps #319 to #329 in FIG. 5).

Hence, there can be provided the still image-taking device in which when the required light emission intensity is low, the amount of light emission is controlled with high precision, and when the required light emission intensity is high, the strobe image taking operation is conducted with a large amount of light by using the flash light emission mode.

As has been described above, according to the present invention, there can be provided the still image-taking device which lessens the energy loss of the light emission of the strobe light emission device, and can conduct the image taking operation with the strobe with an appropriate amount of light without miscalculating the image taking operation effective distance even at the high speed shutter mode.

Also, there can be provided a still image-taking device that can appropriately conduct the image taking operation with the strobe at the high speed shutter mode even if the strobe light emission device which has no flat light emission mode and emits a light at the flash light emission mode is used.

Also, the still image-taking device can be provided in which when the required light emission intensity is low, the amount of light emission is controlled with high precision, and when the required light emission intensity is high, the strobe image taking operation is appropriately conducted by using the flash light emission mode to set the amount of the light emission to a large amount of light.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image-taking apparatus comprising:
   an image-taking element;
   a first shutter member;
   a second shutter member;
   a control circuit that causes the image-taking element to execute an accumulation operation in a period from a start of traveling of the first shutter member to a start of traveling of the second shutter member; and
   a lighting unit that lights a subject,
   wherein the control circuit causes the lighting unit to start of lighting the subject with a flat light emission intensity, during traveling of the first shutter member,
   causes the image-taking element to execute the accumulation operation in conjunction with a timing at which the flat light emission intensity is stabilized, and
   causes the second shutter member to start of traveling in conjunction with a stop of the accumulation operation of the image-taking element and a stop of lighting of the lighting unit with the flat light emission intensity.

2. A camera according to claim 1, wherein when the control circuit judges that a shutter speed arithmetically calculated based on photometry information of the subject is faster than a shutter speed where the shutter opening is fully opened by the first and second shutter members, a series of operations made by the control circuit is executed.

3. A camera according to claim 1, wherein the control circuit conducts lighting operation by the lighting unit while the image-taking device conducts the accumulation operation.

4. A camera according to claim 1, wherein the control circuit conducts lighting operation by the lighting unit in association with start of the accumulation operation of the image-taking device, and completes the accumulation operation of the image-taking device after the lighting operation has been completed.

5. A camera according to claim 1, wherein the control circuit has a first mode in which the lighting operation is conducted by the lighting unit while the image-taking device conducts the accumulation operation, and a second mode in which the lighting operation is conducted by the lighting unit in association with the start of the accumulation operation of the image-taking device, and the accumulation operation of the image-taking device is completed after the lighting operation has been completed.

6. A camera according to claim 5, wherein the control circuit selects the first mode when a distance to the subject is shorter, and selects the second mode when the distance to the subject is longer.

* * * * *